United States Patent [19]
Wu et al.

[11] Patent Number: 5,776,514
[45] Date of Patent: Jul. 7, 1998

[54] ON-DEMAND FAST CYCLE MOLD

[75] Inventors: Jong Liang Wu; Scott F. Ansell; Carl Crowe, Jr.; Victor Lust, all of Jacksonville; Robert Phillips, Orange Park, all of Fla.

[73] Assignee: Johnson & Johnson Vision Products, Inc., Jacksonville, Fla.

[21] Appl. No.: 717,513

[22] Filed: Sep. 20, 1996

[51] Int. Cl.[6] .................................................. B29C 45/78
[52] U.S. Cl. .................. 425/144; 264/40.6; 264/328.15; 425/547; 425/549; 425/552
[58] Field of Search ................................. 425/144, 549, 425/547, 552; 264/40.6, 328.15

[56] References Cited

U.S. PATENT DOCUMENTS

| | | | |
|---|---|---|---|
| 4,622,001 | 11/1986 | Bright et al. | 425/549 |
| 4,902,454 | 2/1990 | Steinbichler et al. | 425/144 |
| 5,282,735 | 2/1994 | Gellert | 425/549 |

OTHER PUBLICATIONS

Your Connection To Injection Molding Excellence: Modular Manifolds & Master Nozzle Probes, pp. 25,27,28, 29,30,31, Apr. 1986.

Primary Examiner—Tim Heitbrink

[57] ABSTRACT

An on-demand fast cycle mold for producing injection molded products such as polypropylene blister package bases. The on-demand fast cycle mold has a heated and cooled hot runner system which provides a short response time and optimal temperature control. On-demand injection molding is made possible by a pulse modulated closed loop mold cooling system, the cooling design of brazed gate inserts, and an effective layout of the cooling channels. The programming of the software for a computer control system has also been designed to achieve on-demand injection molding. The design of the closed loop mold cooling system incorporates an advanced cooling circuit layout, and provides for easy maintenance and better quality control of the coolant which significantly reduces corrosion and scale buildup. Mold cooling is controlled by sensors installed inside the mold which are used in feedback control loops. The brazed gate inserts provide precise mold temperature control and improved cosmetic appearance of the molded packages. The use of a needle-valve injection nozzle results in reduced cycle time and improved moldability.

16 Claims, 15 Drawing Sheets

ON-DEMAND FAST CYCLE MOLD

BACKGROUND OF THE INVENTION

Field of the Invention

The present invention relates generally to an on-demand fast cycle mold, and more particularly pertains to an on-demand fast cycle package mold having a hot runner system which is both heated and cooled to provide a short response time and optimal temperature control. On-demand injection molding is made possible by a pulse cooling system, the cooling design of gate inserts, and an effective layout of the cooling channels. The programming of the software and hardware has also been designed to achieve on-demand injection molding. The design of a closed loop mold cooling system incorporates an advanced cooling circuit layout and high thermal conductivity inserts, and also provides easy maintenance and better quality control of the coolant which significantly reduces corrosion and scale buildup. Mold cooling is controlled by sensors installed inside the mold which are used in feedback control loops. The design of the gate insert provides precise mold temperature control and improved cosmetic appearance of the molded package. The use of a needle-valve nozzle results in reduced cycle times and improved moldability.

SUMMARY OF THE INVENTION

Accordingly, it is a primary object of the present invention to provide an on-demand fast cycle packaging mold.

A further objection of the subject invention is the provision of an on-demand fast cycle package mold having the following advantages:

1. A high voltage (208–220V versus 24V) heated hot runner system provides a short response time and optimal temperature control.
2. A brazed gate insert provides precise mold temperature control and improves the cosmetic appearance of the package.
3. An optimal gate position improves the integrity of the heat seal.
4. On-demand injection molding is made possible by a pulse modulated cooling system, the cooling design of the brazed gate insert, and an effective layout of the cooling channels.
5. Mold cooling is controlled by sensors installed inside the mold which are used in feedback control loops.
6. A closed-loop cooling system provides easier maintenance and better quality control of the coolant to reduce corrosion and scale buildup.
7. The process variability is minimized compared with conventional mold designs.
8. A needle-valve nozzle results in reduced cycle times and improved moldability.
9. The programming of the software and hardware has been designed to achieve on-demand injection molding.
10. The design of the mold cooling system incorporates an advanced cooling circuit layout and high thermal conductivity inserts, which significantly reduce the cycle time and molding defects.

In accordance with the teachings herein, the present invention provides an on-demand fast cycle mold system for producing injection molded products such as polypropylene blister package bases. The mold system comprises a hot runner system for supplying molten molding material, from any suitable thermoplastic material, to at least one injection nozzle, and the hot runner system is both heated and cooled to provide a short response time and optimal temperature control. The cooling system is a pulse modulated cooling system, wherein in operation of the pulse modulated cooling system, during each molding cycle, after the mold is filled with molten plastic the heat input of the molten plastic is matched by a timed pulse of coolant, after which the mold is allowed to dissipate heat gradients and seek equilibrium such that the molten plastic is cooled with greater uniformity which results in a molded part with reduced stress and better surface appearance. An electric heating system is provided for heating the mold system. A plurality of temperature sensors installed inside the mold system are used in feedback control loops to control the flow of coolant through the cooling system. All of the foregoing features result in reduced cycle time and improved moldability.

In greater detail, the electric heating system includes a high voltage heater operated by 208–220V to provide a short response time and optimal temperature control. The injection nozzle is heated by an electrical heating coil which is positioned around the injection nozzle. A high thermal conductivity gate insert includes an annular coolant flow passage around the injection nozzle to provide precise mold temperature control and improved cosmetic appearance of the molded product. The mold includes an upper bowl insert defining an upper surface of a bowl being molded which includes a central coolant flow passage extending centrally therein for cooling the upper bowl insert. The mold further includes a lower bowl insert defining a lower surface of a bowl being molded which includes an annular coolant flow passage which is positioned around the lower bowl insert for cooling thereof. The mold system produces injection molded polypropylene blister package bases, each of which defines a bowl portion which is adapted to package a hydrogel contact lens immersed in a saline packaging solution in the bowl, and also a tail portion. Each mold cavity is monitored for temperature by first and second thermocouples, a first thermocouple positioned to sense the temperature by the tail portion of the blister package base and a second thermocouple positioned to sense the temperature by the bowl portion of the blister package base.

The mold can comprise a 16 cavity, hot manifold design which includes a stationary mold side and a moveable mold side which are clamped together during an injection molding process, and after setting of the molded product, the movable mold side is released and displaced away from the stationary mold side to enable the injection molded products to be ejected from the mold cavities. The mold system includes a hot runner system, with the initial flow of the hot runner system being in the center of the hot manifold mold design, and branching left and right and also forward and backward, and downwardly to a symmetrical arrangement of 16 mold cavities, having 4 rows of 4 mold cavities.

The molded product is preferably injection molded from polypropylene, and the polypropylene melt temperature is controlled to within a narrow temperature range to avoid polypropylene melt freeze off or drooling during injection mold operations.

The cooling system comprises a closed loop cooling system for cooling the hot manifold mold, which includes a coolant pump for supplying coolant to a plurality of solenoid operated mold supply valves for a plurality of cooling zones. The coolant flows from the plurality of supply valves to a plurality of supply in-line manifolds, each having a plurality of cooling paths. The coolant returns through return lines to a plurality of manual return shutoff shaft valves, each with a flow turbine and remote flow sensor, and from there to a coolant tank to be recycled by the coolant pump. The mold system includes a plurality of temperature sensors, a temperature sensor for each cooling zone, and each temperature sensor provides an input to a zone control system for each solenoid operated valve. The coolant flows through a shell and tube heat exchanger where it is cooled to a selected proper temperature by a chiller solution supplied and returned through a temperature controller valve, which is controlled by a temperature sensor mounted in the coolant tank.

BRIEF DESCRIPTION OF THE DRAWINGS

The foregoing objects and advantages of the present invention for an on-demand fast cycle mold may be more readily understood by one skilled in the art with reference being had to the following detailed description of several preferred embodiments thereof, taken in conjunction with the accompanying drawings wherein like elements are designated by the identical reference numerals throughout the several views, and in which.

DETAILED DESCRIPTION OF THE DRAWINGS

Figure 1:
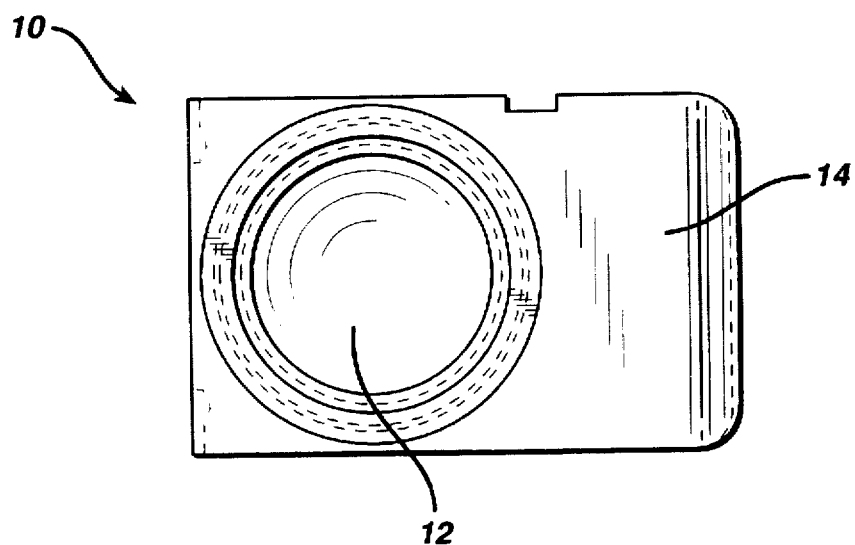
FIGS. 1 and 2 are respectively top plan and side sectional views of a polypropylene blister package base which can be molded pursuant to the teachings of the present invention.
Figure 2:
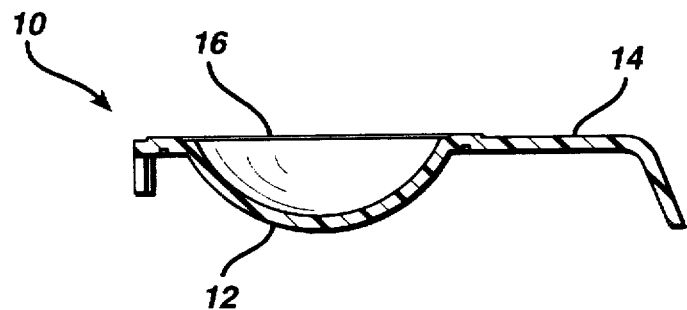

Referring to the drawings in detail, FIGS. 1 and 2 are respectively top plan and side sectional views of a polypropylene blister package base 10 which can be molded pursuant to the teachings of the present invention. The polypropylene blister package base 10 defines a bowl section 12 which is adapted to package a hydrogel contact lens immersed in a saline packaging solution in the bowl, and a tail portion 14, and includes a cover strip and label 16 adhered over the top of the blister package base.

As recognized generally in the prior art, polypropylene blister package bases can be produced in a 16 cavity, hot manifold mold design which includes a stationary mold side (A side) and a moveable mold side (B side) which are clamped together during an injection molding process. Thereafter, after setting of the polypropylene, the movable mold side is released and displaced away from the stationary mold to enable the 16 injection molded blister package bases to be ejected from the mold cavities.

Figure 3:
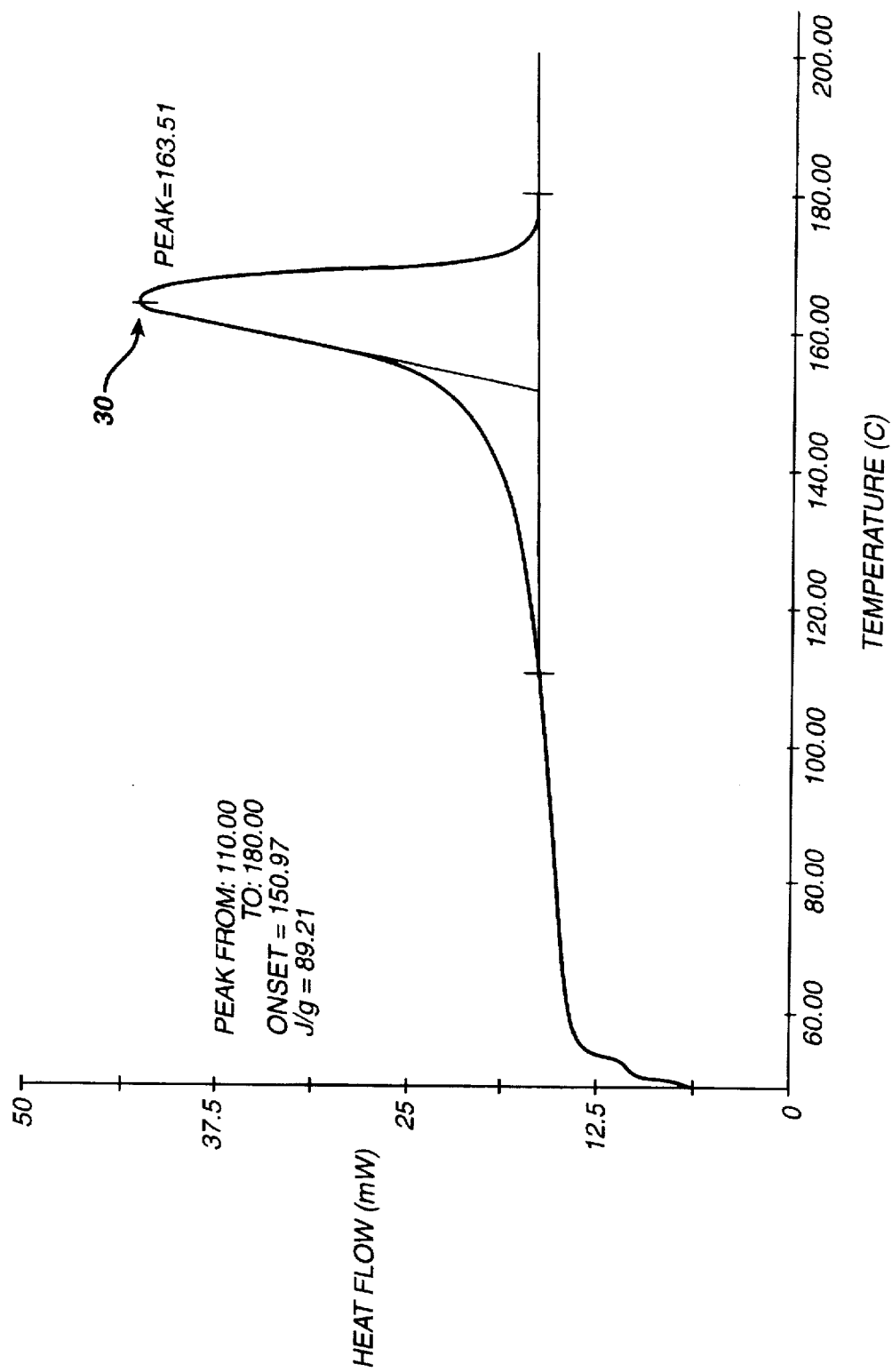
FIG. 3 is a graph of the heat flow characteristics of polypropylene as a function of temperature, and illustrates a sharp melting point for polypropylene and hence the need to control the polypropylene melt temperature to within a narrow temperature range to avoid polypropylene melt freeze off or drooling during injection molding operations.

The blister package bases 10 are preferably molded from polypropylene. FIG. 3 is a graph of the heat flow characteristics of polypropylene as a function of temperature. FIG. 3 illustrates a sharp melting point at 30 for polypropylene, which represents a desired temperature range in which to injection mold the polyprolylene, within which the polypropylene does not freeze off or present problems with drooling. This illustrates the need to control the polypropylene melt temperature to within a narrow temperature range to avoid polypropylene melt freeze off or drooling during injection mold operations.

Figure 4:
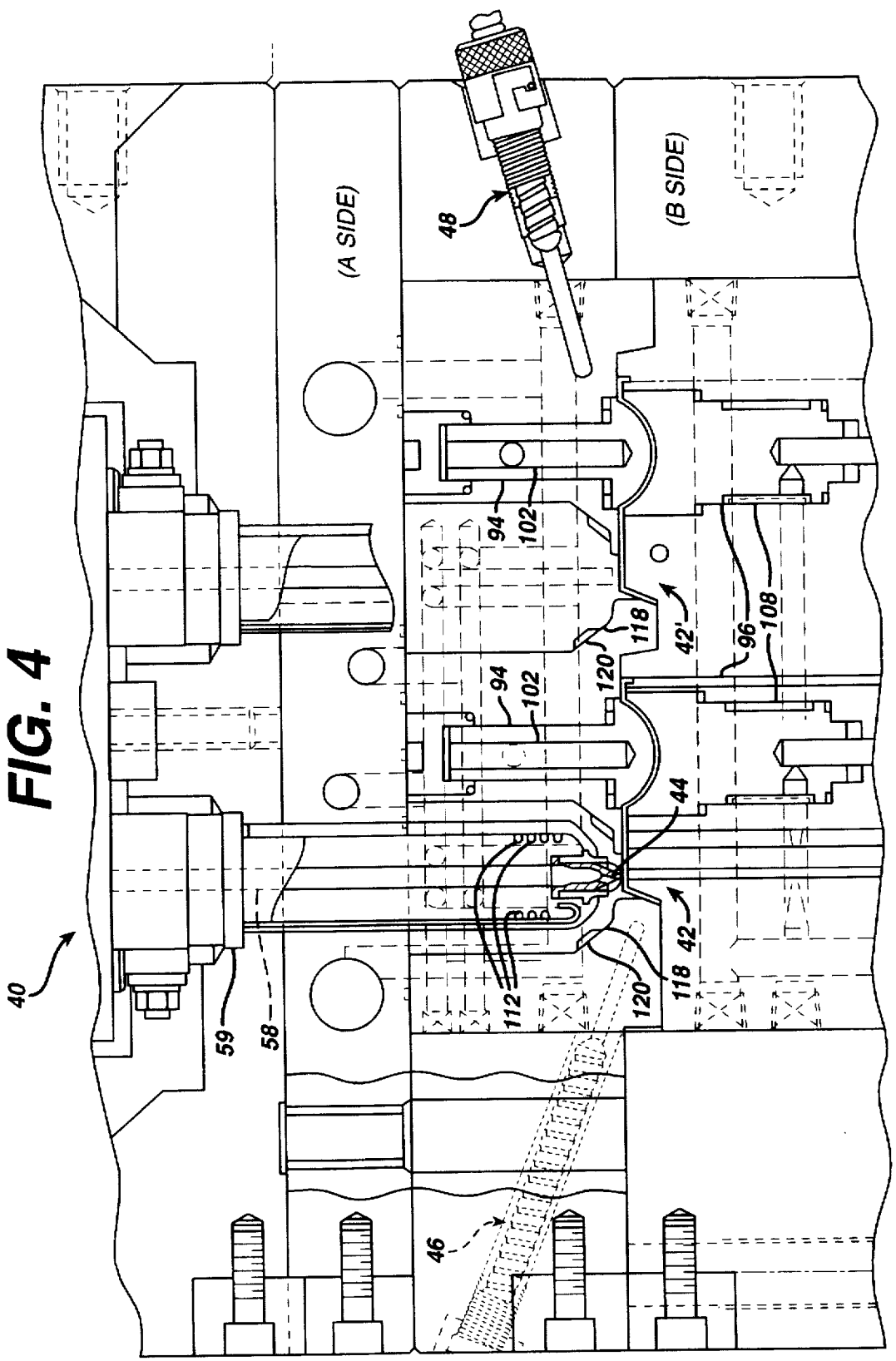
FIG. 4 illustrates a front elevational view, partly in section, of one portion of an assembly of a 16 cavity, hot manifold mold design, and illustrates 2 of the 16 mold cavities, details of 1 injection nozzle, and 2 thermocouples positioned to sense the temperature at two locations in the hot manifold mold.

FIG. 4 illustrates a front elevational view, partly in section, of one portion of a 16 cavity, hot manifold mold design 40, and illustrates 2 of the 16 mold cavities 42 and 42', details of 1 injection nozzle 44, and 2 thermocouples 46, 48 positioned to sense the temperature at two locations in the hot manifold mold. The 2 mold cavities illustrated in FIG. 4 are monitored for temperature by 2 thermocouples, a first thermocouple 46 positioned to sense the temperature by the tail portion of the left blister package base 42 and a second thermocouple 48 positioned to sense the temperature by the bowl portion of the right blister package base 42'.

The details of several of the components illustrated generally in FIG. 4 such as the mold cavities, mold inserts and nozzles, and the heating and cooling of those components, will be explained in greater detail hereinbelow with reference to the remaining Figures which better illustrate those components. However, FIG. 4 illustrates a heating coil 112, shown in further detail in FIG. 12, placed around the injection nozzle 44, and also illustrates the placement of a cooled gate insert 118, shown in further detail in FIG. 13, around the injection nozzle 44. The cooled gate insert 118 includes an annular coolant flow passageway 120 therearound for precise controlled cooling of the mold at that location. FIG. 4 also illustrates the placement of upper and lower bowl inserts 94, 96, shown in further detail in FIGS. 10 and 11, forming the cavity of the bowl portion being molded.

Figure 5:
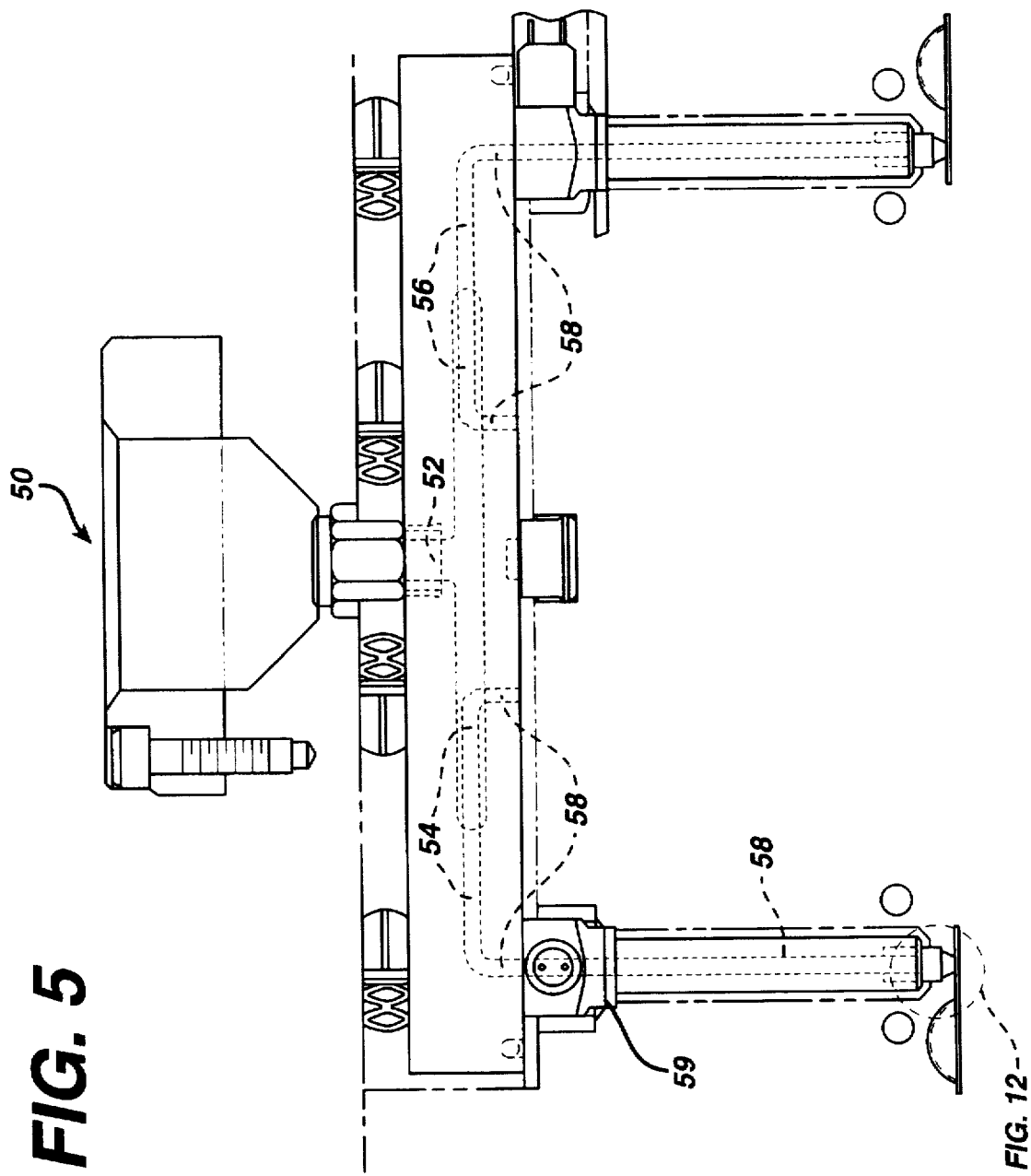
FIG. 5 illustrates details of the hot runner system of the hot manifold mold design.

FIG. 5 illustrates details of the hot runner system of the hot manifold mold design. A polypropylene extruder at 50 extrudes molten polypropylene through a hot runner system, with the initial flow of the hot runner system being in the center of the hot manifold mold design at 52 and branching left and right at 54 and 56 and also forward and backward (not shown), and downwardly at 58, as viewed in FIG. 5, to a symmetrical arrangement of 16 mold cavities, having 4 rows of 4 mold cavities, each of which is similar to the mold cavities shown in FIG. 4. FIG. 5 also illustrates the placement of a high voltage (220V) 450 watt heater element 59 to heat the polypropylene hot runner system.

Figure 6:
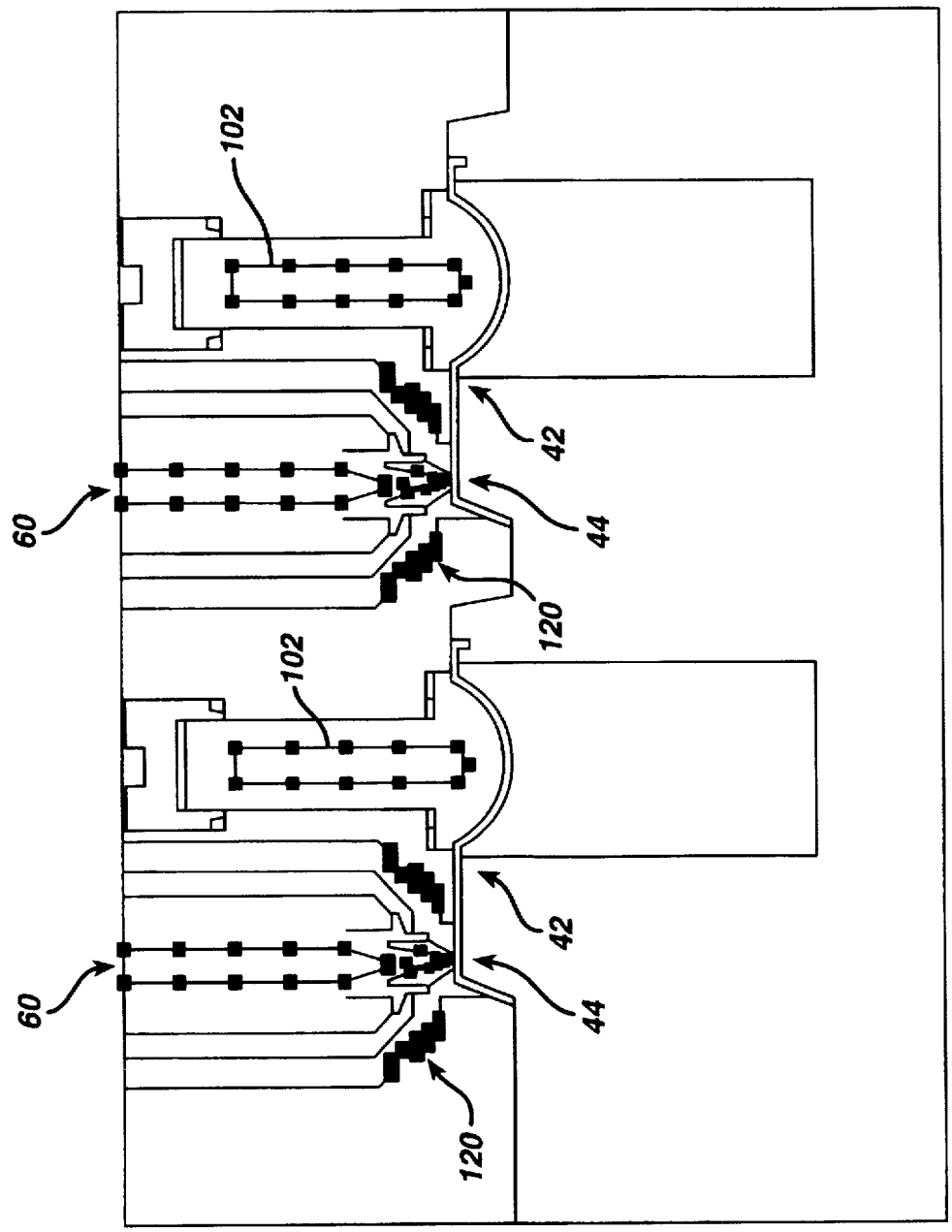
FIG. 6 illustrates the flow of coolant in 2 zones around each mold cavity and also the flow of molten polypropylene therein.

FIG. 6 illustrates the flow 60 of molten polypropylene, at an initial average melt temperature of 198° (212.5°)C. through the centers of two heated injection nozzles 44, into two cooled blister package base mold cavities 42, at an average mold temperature of 45° C. Two cooling paths 120, 102 are illustrated, a first annular coolant flown passageway 120 around the gate insert 118 positioned around the injection nozzle 44 at the tail portion of the blister package, and a second coolant flow passageway 102 through the top bowl insert portion of the mold. A third cooling flow path through the bottom bowl insert portion of the mold is not illustrated in FIG. 6. These typical temperatures provide a cycle time of approximately 7.0 seconds.

Figure 7:
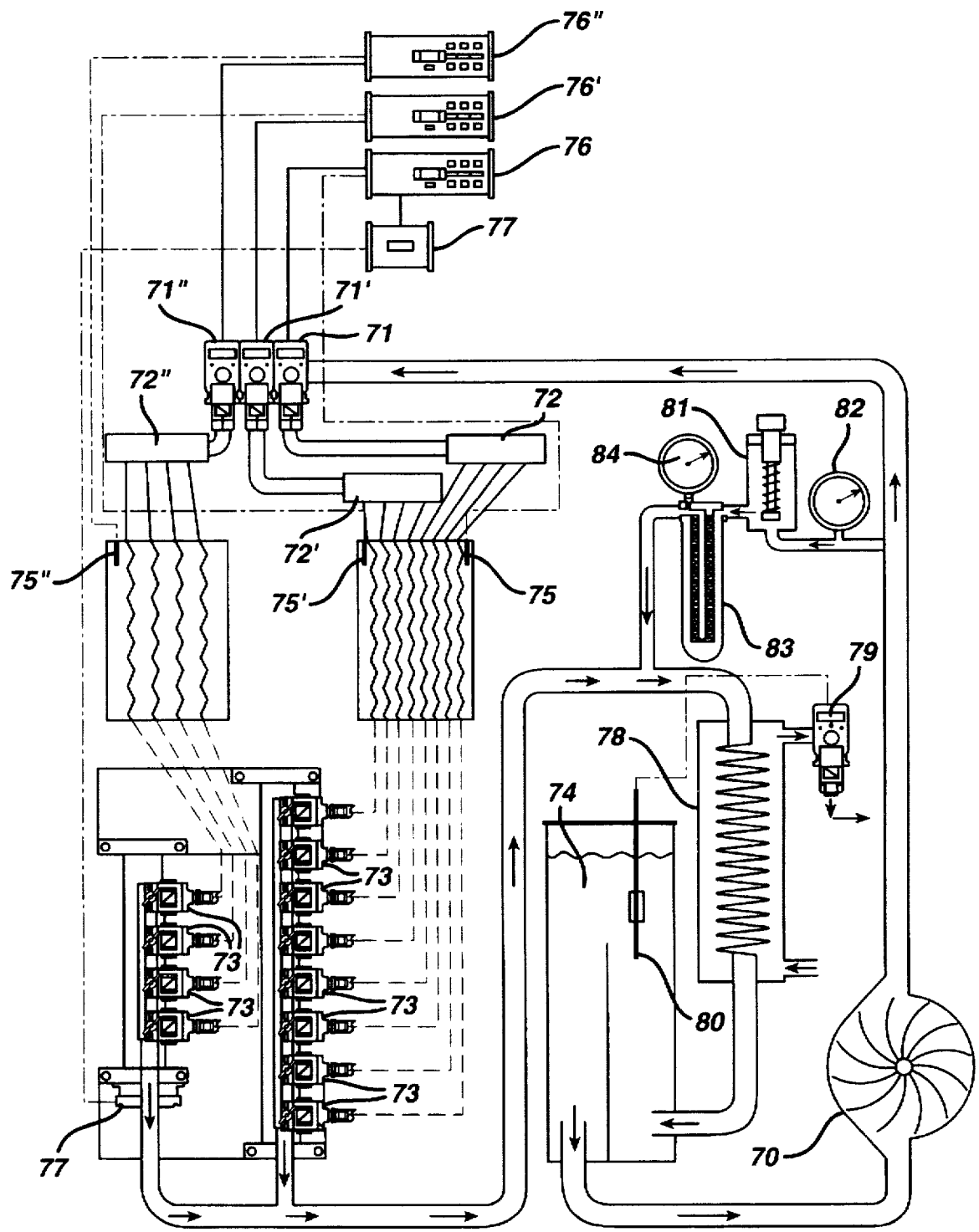
FIG. 7 illustrates a closed loop cooling system for cooling the hot manifold mold for a 16 cavity lens tray mold design.

FIG. 7 illustrates the closed loop cooling system for cooling the hot manifold mold design. FIG. 7 illustrates the coolant circuit from a stainless steel high temperature water pump 70 to a first solenoid operated mold supply valve 71 for zone 1, to a second solenoid operated mold supply valve 71' for zone 2, circuit 1, and to a third solenoid operated mold supply valve 71" for zone 2, circuit 2. The coolant flows from the first valve 71 to a zone 1 supply in-line manifold 72, and through 4 outputs to 4 cooling paths. The coolant flows from the second valve 71' to a zone 2, circuit 1 supply in line manifold 72' through 4 outputs to 4 cooling paths, and likewise for zone 2, circuit 2, through a zone 2, circuit 2 in-line manifold 72" through 4 outlets to 4 cooling paths. The coolant returns through 12 return lines to 12 manual return shutoff shaft valves 73, each equipped with a flow turbine and remote flow sensor, and from there to a stainless steel coolant tank 74 to be recycled by the water pump. Three temperature sensors are provided, a first temperature sensor 75 for zone 1, a second temperature sensor 75' for zone 2, circuit 1, and a third temperature sensor 75" for zone 2, circuit 2. Each temperature sensor provides an input to a zone control system 76, 76', 76" for each solenoid operated valve 73. A flow monitor 77 provides a gallon per minute (GPM) monitor signal for zone 2, circuit 2.

The coolant returns from the solenoid operated valves 73 and flows through a shell and tube heat exchanger 78 where it is cooled to a selected proper temperature by a chiller solution supplied and returned through a full flow temperature controller water saver valve 79, which is controlled by a temperature sensor 80 mounted on a float safety switch in the coolant tank. The pressure of the coolant in the closed loop is controlled by an adjustable pressure valve 81 in the closed loop downstream of the coolant pump 70, monitored by a pressure gauge 82, and the cooling system also includes a bypass filter 83 also having a pressure gauge 84.

Figure 8:
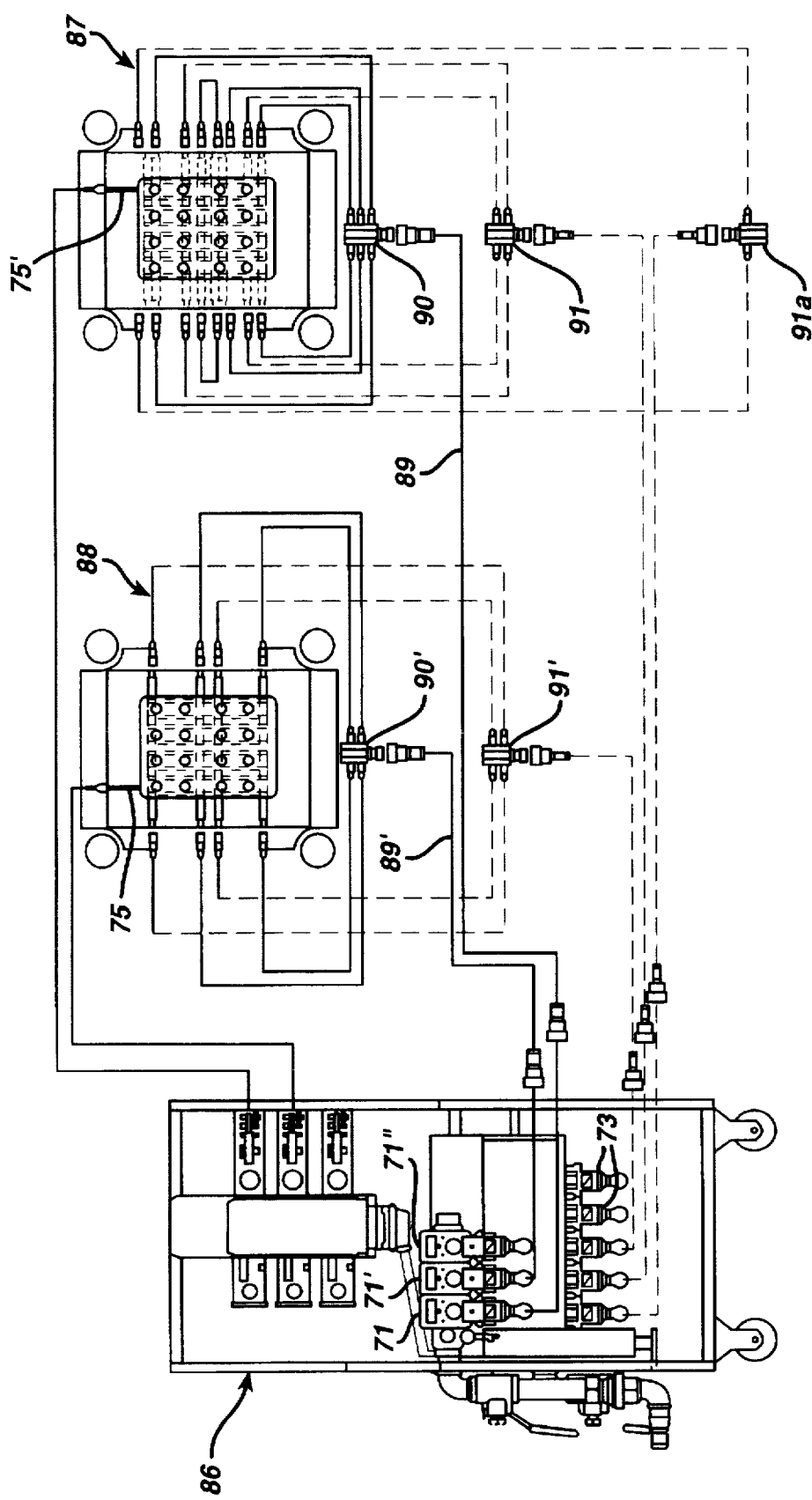
FIG. 8 illustrates further details of the cooling system.
Figure 9:
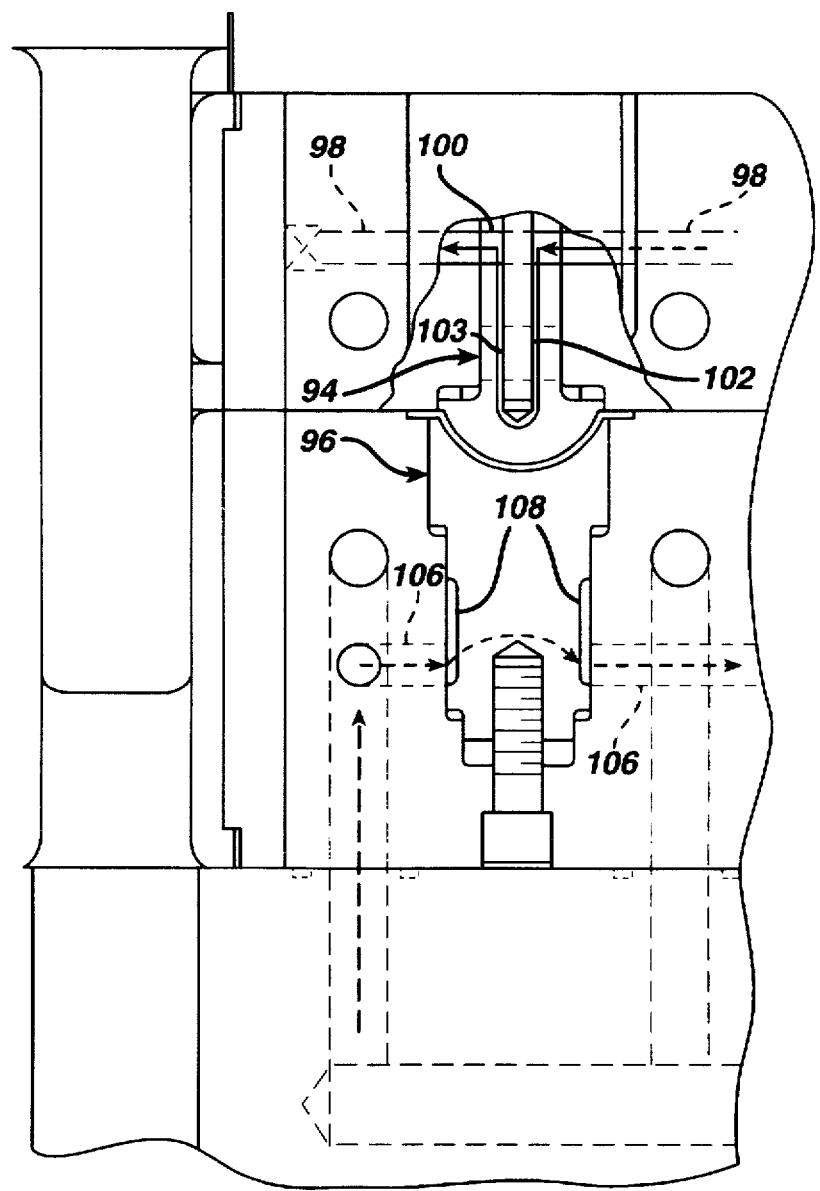
FIG. 9 illustrates an assembly of the upper and lower bowl inserts of each mold forming the cavity of the blister package bowl, and illustrates the flow of coolant therethrough.

FIG. 8 illustrates further details of the cooling system for the 16 cavity mold design. FIG. 8 illustrates the coolant flow from a coolant console 86 to the stationary side 87 of the mold, and also to the moveable side 88 of the mold. Two supply hoses 89, 89' supply the coolant, the first supply hose 89 to a supply manifold 90 having six supply conduits for supply zone 1, circuits 1 and 2, in the stationary side 87 of the mold and the second supply hose 89' to a supply manifold 90' having four supply conduits for supply zone 2 in the moveable side of the mold. The zone 1 coolant flows through separate coolant circuits 1 and 2 in zone 1, and returns from zone 1, circuit 1 and circuit 2, to return manifolds 91, 91a. The zone 2 coolant flows through zone 2 through 4 returns hoses to the return manifold 91' and then through return hoses to the cooling console. The cooling console 86 includes equipment for monitoring and controlling the flow of coolant in the three zones, and contains therein the components 70, 71, 73, 74, 76, 77, 78, 79, 80, 81, 82 and 83 illustrated in FIG. 7. FIG. 9 also illustrates the cooling hoses with couplings comprising male plugs and female sockets.

Figure 10:
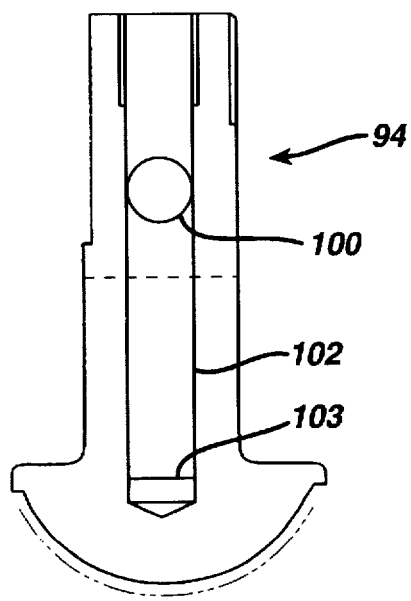
FIGS. 10 and 11 are two separate views of the upper and lower bowl inserts forming the cavity of the blister package bowl, as illustrated in FIG. 9.
Figure 11:
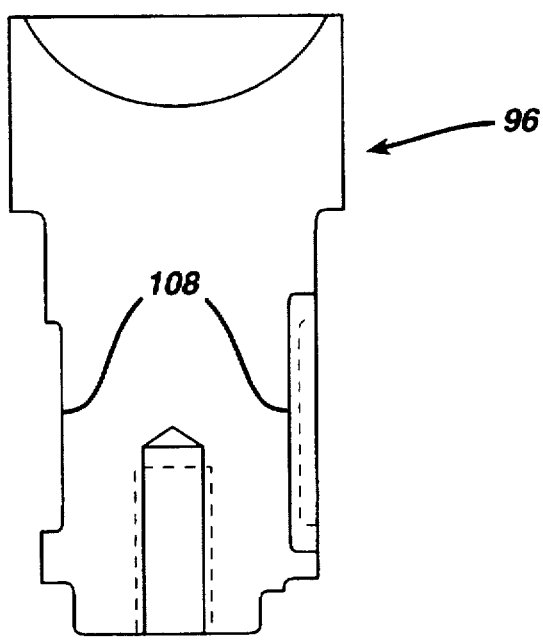

FIG. 9 illustrates an assembly of the upper and lower bowl inserts 94, 96 of the mold forming the cavity of the bowl, and illustrates the flow paths of coolant therethrough. FIGS. 10 and 11 are respectively two separate views of the upper and lower bowl inserts 94, 96 forming the cavity of the bowl, as illustrated in FIGS. 4 and 9.

The coolant for the upper bowl insert 94 flows through a coolant passage 98 on the right side of the upper cavity mold 94, through a flow aperture 100 in the upper cavity mold, down and into a central coolant passage 102 of the upper cavity mold 94, and then up and out through the left portion of the flow aperture 100 and left portion of coolant passage 98. The central coolant passageway 102 includes a central partition 103 between the inlet flow aperture 100 and the outlet flow aperture 100 which extends almost to the bottom of the central coolant passage 102, and which forces the coolant to flow therearound down to the bottom of the central passage 102.

Likewise, the coolant for the lower bowl insert 96 flows through a coolant passage 106 on the left side of the lower bowl cavity 96, and in and around an annular cooling passageway 108 defined around the lower bowl insert, and then out through the right portion of the coolant passage 106.

Traditionally, brass in the form of CuZn30 (an alloy of 70% Cu and 30% Zinc) has been used to prepare optical quality inserts, such as inserts 94 and 96, by electroless Ni-plating and diamond turning.

The present invention, after extensive research and development, has developed optical quality inserts formed of the alloy Ampco 940 which were Ni-plated and then diamond turned to produce a mold insert having an optical quality finish. Ampco 940 is an alloy developed by Ampco Metal, Inc., which is approximately 96.4% Cu. 02.5% Ni;, 00.7% Si, and 00.4% Cr.

The following chart presents a comparison of the thermal conductivities of Ampco 940(AMPCO 940) with materials which have been used most frequently to produce mold inserts.

| | Thermal Conductivity BTU/ft/hr/ft2/°F.) |
|---|---|
| AMPCO 940 | 125 |
| H-13 | 17 |
| AISI 6150 | 27 |
| STAVAX | 14 |

-continued

| | Thermal Conductivity BTU/ft/hr/ft2/°F.) |
|---|---|
| VASCOMAX | 14.6 |
| BRASS (CuZn30) | 70 |
| NO94 | 30 |

The Ampco 940 optical quality inserts reduce injection molding cycle times, provide better mechanical strength, improve the longevity of the inserts, and provide an optical finish.

The Ampco 940 alloy provides ease of machinability, good adhesion between the substrate material and an electroless Ni layer, can be turned by a diamond cutter to provide an optical finish, have sufficient mechanical strength to withstand the extreme high pressures (8000–14,000 psi) applied during the injection molding process without deformation, and provide high thermal conductivity.

Optical quality inserts of Ampco 940 were produced by preparing a blank by diamond turning an Ampco 940 rod to the specified insert geometry, then electroless Ni-plating the Ampco 940 blanks to a thickness of 120 to 200 µm, and then diamond turning the plated blanks to produce an optical quality finish mold insert to the final dimensions (with a remaining Ni thickness of around 80 µm).

Figure 12:
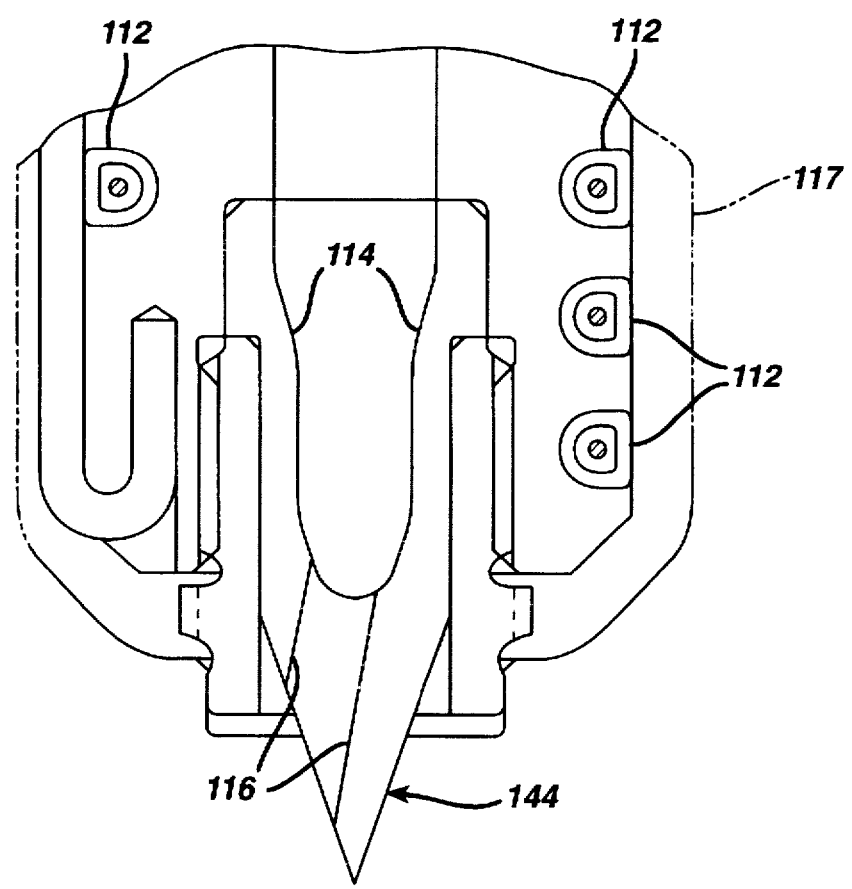
FIG. 12 is a detail view of each injection nozzle, taken at detail circle 12 in FIG. 5, and illustrates the heating coils therein to maintain the molten polypropylene heated to within a narrow temperature range.

FIG. 12 is a detailed view of each injection nozzle 44, taken at detail circle 12 in FIG. 5, and illustrates the heating coils 112 therein to maintain the molten polypropylene heated to within a narrow temperature range. Each injection nozzle 44 includes a central polypropylene flow passage 114 which terminates in a needle-valve injection passage 116 at its lower end. Each injection nozzle 44 is positioned in and supported by a housing 117.

Figure 13:
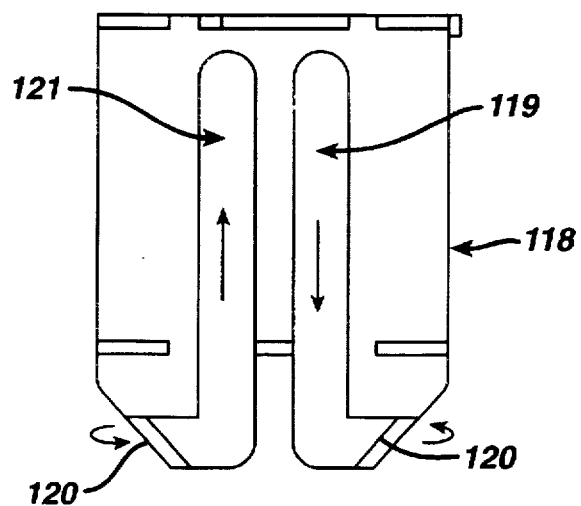
FIG. 13 is a separate view of the gate insert.

FIG. 13 is a separate view of the gate insert 118 for each injection nozzle 44, and illustrates the detailed construction of each brazed gate insert 118, with an inlet coolant flow passage 119, an annular coolant flow passageway 120 therearound and an outlet coolant flow passage 121. The coolant enters through an inlet flow passage 119 and flows downwardly to and around the annular coolant flow passageway 120 and then flows upwardly through an outlet flow passage 121.

Figure 14:
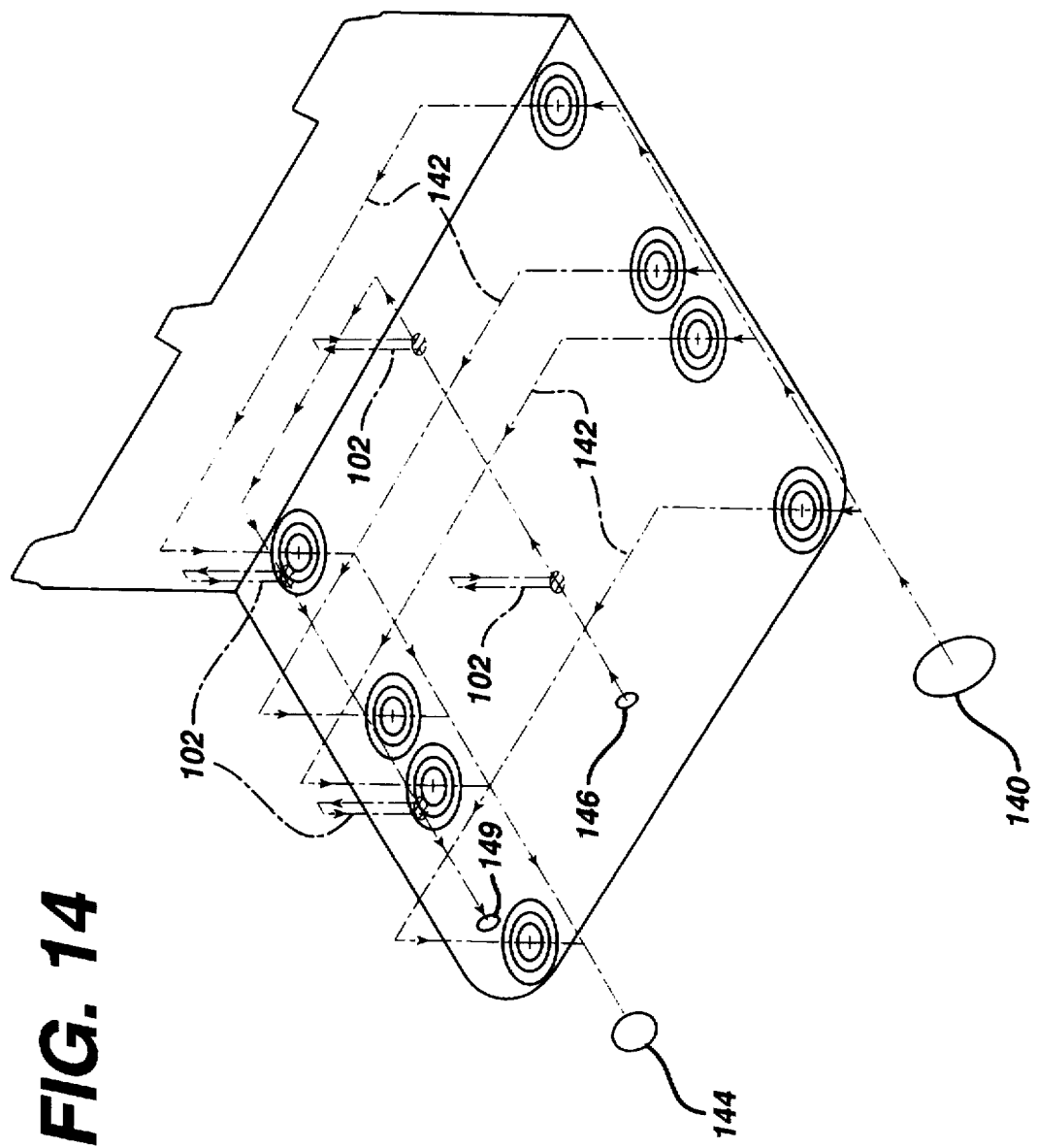
FIG. 14 illustrates 4 coolant flow paths from a main block through 4 cavity insert mains and also a separate coolant flow path through 4 bowl inserts, and also the return of the coolant to the main block.

FIG. 14 illustrates a first cooling circuit comprising 4 coolant flow paths from an entrance to the main block at 140, through four parallel flow paths 142 for cooling the A side main mold block, and a return from the main block at 144. FIG. 14 also illustrates a second cooling circuit comprising a coolant flow path from an inlet at 146 through 4 upper bowl inserts at 102 (as illustrated in FIG. 9), and then the return of the coolant to an outlet at 149.

Figure 15:
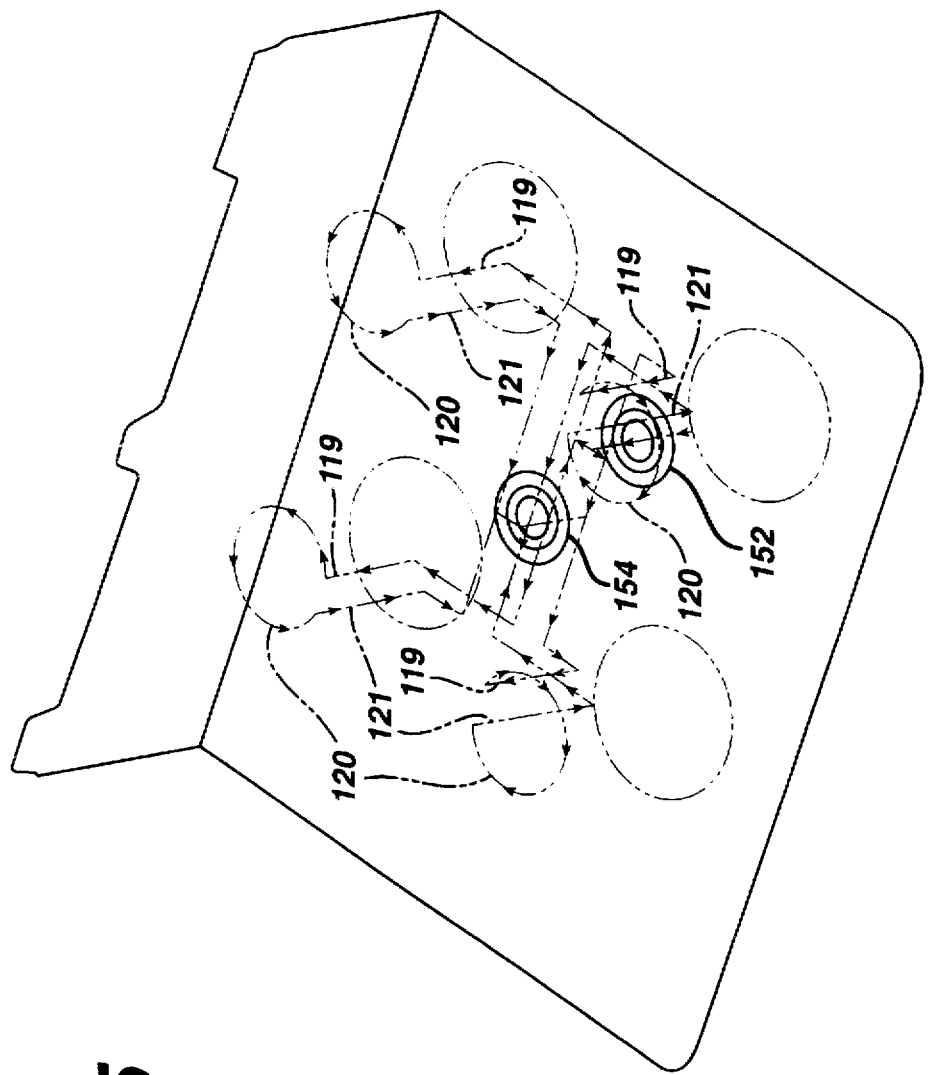
FIG. 15 illustrates 4 coolant flow paths through and around 4 cavity insert gate bushings and also the return of the coolant to the main block.

FIG. 15 illustrates 4 coolant flow paths from a coolant inlet passage 152 through 4 inlet flow passages 119 to 4 annular cooling paths 120 around 4 cavity gate inserts 118, and also return coolant flow passages at 121 to a coolant outlet passage 154.

Figure 16:
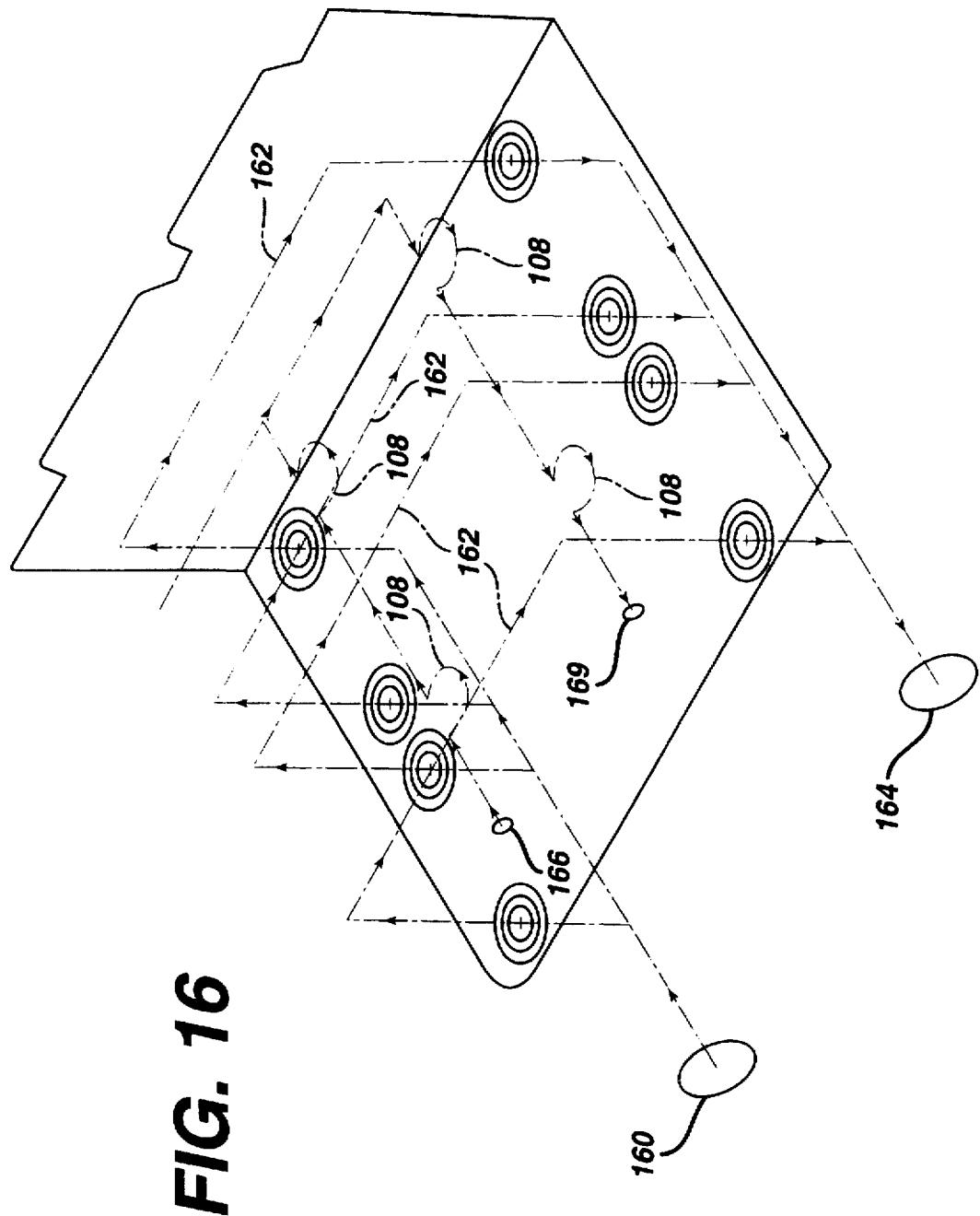
FIG. 16 illustrates 4 coolant flow paths from a main block through 4 core, inserts, and also a separate coolant flow path through and around 4 bowl inserts, and also the return of the coolant to the main block.

FIG. 16 illustrates a first cooling circuit comprising 4 coolant flow paths from an entrance to the main block at 160 through 4 parallel flow paths 162 for cooling the B side main mold block, and a coolant return from the main block at 164. FIG. 16 also illustrates a second cooling circuit comprising a coolant inlet passage at 166, to 4 annular coolant channels at 108 around each of the 4 lower bowl insert 96, and to a return coolant passage at 169.

The present invention provides an on-demand fast cycle injecting molding system which uses a pulse modulated cooling system for the mold. Pulse modulated cooling technology has been applied to control the temperature of injection molding machines and molds, and uses different methods to pulse the flow of the water coolant and control the mold.

Figure 17:
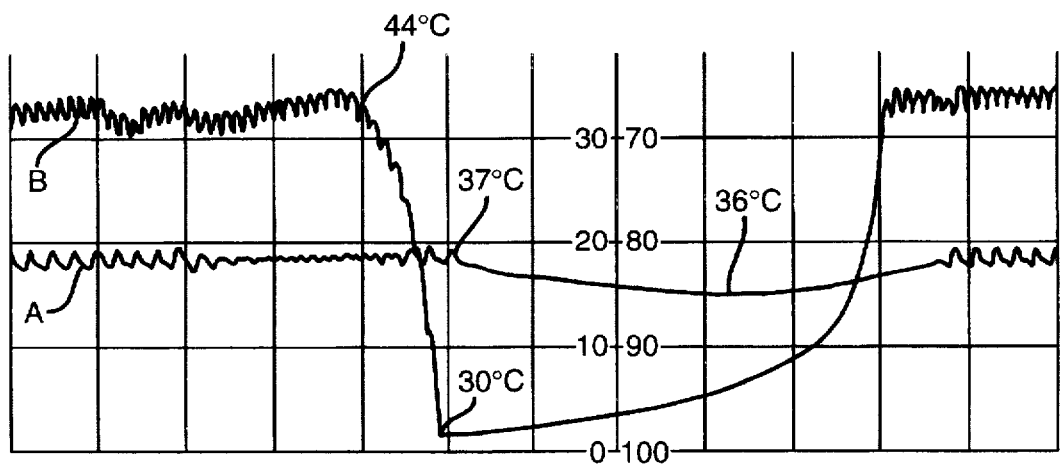
FIG. 17 illustrates a graph B of temperature versus time for an interruption of a molding cycle of operation for an injection molding system having a conventional, continuous flow cooling system, and a graph A of temperature versus time for an interruption of a molding cycle of operation for the injection molding system of the present invention which has a pulse modulated cooling system.

The pulse modulated mold temperature control system of the present invention uses a process controller capable of performing feed forward or feedback control. The accuracy of mold temperature control achieved by pulse modulated cooling has proven to be excellent. FIG. 17 illustrates a graph B of temperature versus time for an interruption of a molding cycle of operation for an injection molding system having a conventional, continuous flow cooling system, and a graph A of temperature versus time for an interruption of a molding cycle of operation for the injection molding system of the present invention which has a pulse modulated cooling system. When the injection molding cycle is interrupted with conventional mold cooling technology, a drop of 10° C. in temperature was experienced, while with the pulse modulated mold cooling only a 1° C. drop in mold temperature was experienced. The capability of precise control of mold temperature when the molding cycle is interrupted or is stopped has proven to be a key element of successful on-demand injection molding.

In a pulse modulated cooling system, during each molding cycle, the melt heat input is matched by a timed, phase shifted (delayed) cooling pulse which takes effect just after mold filling to provide a preferred state of thermal equilibrium.

During a molding cycle:

1. A hot melt (shot) is injected into the mold cavity and contacts a thermally relaxed mold surface. There is no forced gradient caused by a continuously flowing cooling medium. The molding surface is allowed to "spike" upwardly in temperature resulting in high gloss and good surface finish.

2. A temperature sensor, located just below the mold surface, measures the rise in temperature induced by the melt.

3. A microprocessor based controller analyzes the thermal profile of the mold/melt temperature/volume relationship, and controls the injection of a measured pulse of cooling medium into the mold cooling channels. This cooling pulse matches the amount of heat that has to be removed to maintain thermal balance and produce a satisfactory molded part.

4. The cavities are filled and the gate is frozen.

5. The pulse of cold water (from a high $\Delta t$ cooling chiller) controls the cooling of the part. The surface is rapidly cooled, "skinning" the part surface. This reduces surface sinks and allows the part to shrink internally eliminates (eliminates voids in thick sections).

The pulse modulated cooling process results in high quality molded parts with a reduced cycle time (typically, 10 to 25%). The rapid, unrestricted rise in the mold surface temperature produces a high quality part surface appearance. The rapidly declining temperature caused by the high $\Delta t$ of the cooling pulse causes rapid skinning of the part surface and quickly removes the excess heat. Following the cooling pulse, a heat gradient dissipation period follows which provides time for heat gradients to dissipate, providing a uniform gate and molding surface temperature for the next cycle.

With a pulse modulated cooling system, there is a minimal temperature difference on the molding surface near the "IN"

and "OUT" water lines. Because heat gradients are allowed to dissipate, molded parts are produced with higher part uniformity and less stress on the molded parts. The expanded process window offers either improved part quality or reduced molding cycle time or a combination of both. Since the cyclic heat input (melt) is matched by the cyclic cooling pulse, the mold is allowed to dissipate the heat gradients and seek equilibrium. The melt is cooled with greater uniformity which results in parts with reduced stress and better surface appearance.

Mold temperature drift is eliminated because the operation of the coolant control valve is automatically timed to produce a modulated cooling pulse matching the amount of excess heat. The cooling pulse may be as short as 0. second or up to 100% of the molding cycle.

Figure 18:
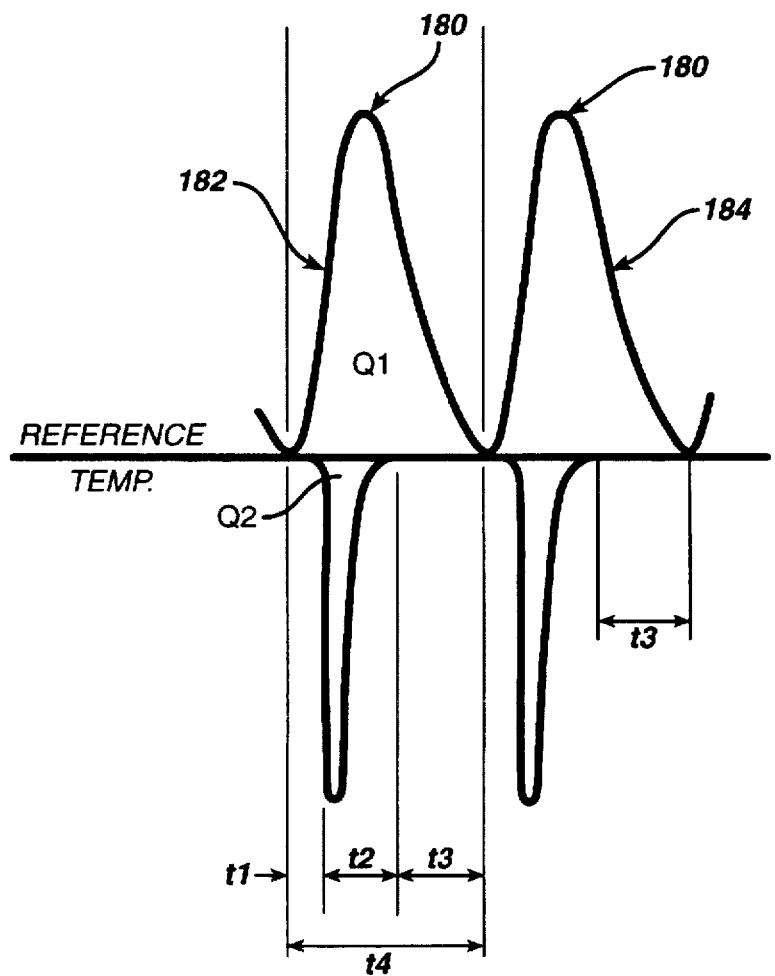
FIG. 18 is a graph which illustrates the principles of operation of a pulse modulated cooling system as implemented by the present invention.

FIG. 18 is an exemplary graph which illustrates the principles of operation of a pulse modulated cooling system. The peaks 180 indicate points in the molding cycle when the mold is filled. The rising temperature at slope 182 represents a rapid, unrestricted mold surface temperature rise which produces a high quality part surface appearance. The falling temperature at slope 184 represents a rapidly declining temperature from the high $\Delta t$ of the cooling pulse which causes rapid skinning of the part surface and quickly removes the excess heat.

In FIG. 18, Q1 represents the melt heat, Q2 represents the cooling pulse, t1 represents the valve reaction time, t2 represents the valve open time, t3 represents the gradient dissipation time, and t4 represents the overall cycle.

With on-demand molding, the ability to run a 6 second, 10 minute, or 30 minute cycle time is possible without any dimensional or mechanical property changes to the resultant molded package. This is possible due to the concept of pulse cooling (control of the mold temperature) and integration of the gate cooling.

While several embodiments and variations of the present invention for an on-demand fast cycle packaging mold are described in detail herein, it should be apparent that the disclosure and teachings of the present invention will suggest many alternative designs to those skilled in the art.

We claim:

1. An on-demand fast cycle mold system for producing injection molded products, comprising at least one mold, wherein the mold includes an upper bowl insert defining an upper surface of a bowl being molded and a lower bowl insert defining a lower surface of a bowl being molded, the upper bowl insert includes a central coolant flow passage extending longitudinally centrally therein for conveying coolant for cooling the upper bowl insert, a hot runner system for supplying molten plastic to at least one injection nozzle, a high thermal conductivity gate insert surrounding said at least one injection nozzle and having an annular coolant flow passage therein positioned around said at least one injection nozzle to provide precise mold temperature control and improved cosmetic appearance of the molded product, and the mold system is both heated and cooled to provide a short response time and optimal temperature control, including a pulse modulated cooling system for cooling the mold system, wherein in operation of the pulse modulated cooling system, during each molding cycle, after the mold is filled with molten plastic the heat input of the molten plastic is matched by a timed pulse of coolant, after which the mold is allowed to dissipate heat gradients and seek equilibrium such that the molten plastic is cooled, an electric heating system for heating the mold system, a plurality of temperature sensors installed inside the mold system, which are used in control loops to control the flow of coolant through the pulse modulated cooling system.

2. An on-demand fast cycle mold system as claimed in claim 1, wherein the electric heating system includes a high voltage electrical heater operated by 208–220V to heat the hot runner system and provide a short response time and optimal temperature control.

3. An on-demand fast cycle mold system as claimed in claim 1, wherein the injection nozzle is heated by an electrical heating coil which is housed surrounding the injection nozzle.

4. An on-demand fast cycle mold system as claimed in claim 1, wherein each insert has a mold surface with an optical quality finish, and formed of an alloy which is approximately 96.4% Cu, 02.5% Ni, 00.7% Si, and 00.4% Cr, which is nickel plated and then diamond turned to produce a mold insert having an optical quality finish.

5. An on-demand fast cycle mold system as claimed in claim 1, wherein the lower bowl insert includes an annular coolant flow passage which surrounds the lower bowl insert for conveying coolant for cooling the lower bowl insert.

6. An on-demand fast cycle mold system as claimed in claim 1, wherein the mold system produces injection molded polypropylene blister package bases, each of which defines a bowl portion which is adapted to package a product, and a tail portion.

7. An on-demand fast cycle mold system as claimed in claim 6, wherein the mold system is monitored for temperature by at least first and second thermocouples, a first thermocouple positioned to sense the temperature by the tail portion of the blister package base, and a second thermocouple positioned to sense the temperature by the bowl portion of the blister package base.

8. An on-demand fast cycle mold system as claimed in claim 1, wherein the mold comprises a 16 cavity, hot manifold mold which includes a stationary mold side and a moveable mold side which are clamped together during an injection molding process, and after setting of the molded product, the movable mold side is released and displaced away from the stationary mold side to enable the injection molded products to be ejected from the mold cavities.

9. An on-demand fast cycle mold system as claimed in claim 8, wherein the initial flow of the hot runner system is in the center of the mold system, and branches left and right and also forward and backward, and downwardly to a symmetrical arrangement of 16 mold cavities, having 4 rows of 4 mold cavities.

10. An on-demand fast cycle mold system as claimed in claim 1, wherein the molded product is injection molded from polypropylene, and the polypropylene melt temperature is controlled to within a narrow temperature range to avoid polypropylene melt freeze off or drooling during injection mold operations.

11. An on-demand fast cycle mold system as claimed in claim 1, wherein the pulse modulated cooling system includes a coolant pump for supplying coolant to a plurality of solenoid operated mold supply valves for a plurality of cooling zones, and the coolant flows from the plurality of supply valves to a plurality of supply in-line manifolds, each having a plurality of coolant flow passages.

12. An on-demand fast cycle mold system as claimed in claim 11, wherein the coolant returns through return lines to a plurality of manual return shutoff shaft valves, each with a flow turbine and remote flow sensor, and from there to a coolant tank to be recycled by the coolant pump.

13. An on-demand fast cycle mold system as claimed in claim 11, including a plurality of temperature sensors, a temperature sensor for each cooling zone, and each temperature sensor provides an input to a zone control system for each solenoid operated valve.

14. An on-demand fast cycle mold system as claimed in claim 11, wherein the coolant flows through a shell and tube heat exchanger where said coolant is cooled to a selected temperature by a chiller solution supplied and returned through a temperature controller valve, which is controlled by a temperature sensor.

15. An on-demand fast cycle mold system as claimed in claim 1, wherein the pulse modulated cooling system includes a microprocessor based controller controls the injection of a measured pulse of cooling medium into mold cooling channels.

16. An on-demand fast cycle mold system as claimed in claim 1, wherein the central coolant passage of the upper bowl insert includes a central partition, positioned therein between an inlet flow aperture and an outlet flow aperture, which partition extends almost to the end of the central coolant passage, which forces coolant to flow from the inlet flow aperture to the end of the central passage, around the central partition, and then to the outlet flow aperture, to provide effective cooling of the upper bowl insert.

* * * * *